United States Patent [19]
Suemura et al.

[11] Patent Number: 6,081,557
[45] Date of Patent: Jun. 27, 2000

[54] DATALINK SYSTEM AND COMMUNICATION NETWORK

[75] Inventors: Yoshihiko Suemura; Naoya Henmi, both of Tokyo, Japan

[73] Assignee: NEC Corporation, Tokyo, Japan

[21] Appl. No.: 08/857,807

[22] Filed: May 16, 1997

[30] Foreign Application Priority Data

May 16, 1996 [JP] Japan .................................. 8-146794

[51] Int. Cl.[7] ................................................. H04L 27/00
[52] U.S. Cl. .......................................... 375/259; 375/257
[58] Field of Search ................................... 375/259, 257, 375/258; 370/364, 365, 368; 359/142, 143, 152, 187

[56] References Cited

U.S. PATENT DOCUMENTS

| | | | |
|---|---|---|---|
| 4,064,360 | 12/1977 | Koenig | 178/3 |
| 4,123,624 | 10/1978 | Gagnier et al. | 179/15 AT |
| 4,637,011 | 1/1987 | Crabbe, Jr. | 370/24 |
| 4,908,823 | 3/1990 | Haagens et al. | 370/85.1 |
| 4,947,406 | 8/1990 | Yokoyama | 375/7 |
| 4,977,582 | 12/1990 | Micholas et al. | 375/118 |
| 5,612,953 | 3/1997 | Olnowich | 370/367 |
| 5,715,274 | 2/1998 | Rostoker et al. | 375/200 |
| 5,761,253 | 6/1998 | Fujita et al. | 375/354 |
| 5,793,510 | 8/1998 | Samejima et al. | 359/158 |

FOREIGN PATENT DOCUMENTS

| | | |
|---|---|---|
| 48-38004 | 6/1973 | Japan . |
| 51-136204 | 11/1976 | Japan . |
| 57-141150 | 9/1982 | Japan . |
| 58-24997 | 2/1983 | Japan . |
| 62-136143 | 6/1987 | Japan . |
| 4-287543 | 10/1992 | Japan . |
| 5-91146 | 4/1993 | Japan . |
| 6-53998 | 2/1994 | Japan . |

OTHER PUBLICATIONS

ANSI X3T11, Fibre Channel Physical and Signaling Interface Rev.4.3, 1994, pp. 81–96.

*Primary Examiner*—Stephen Chin
*Assistant Examiner*—Mohammad Ghayour
*Attorney, Agent, or Firm*—Scully, Scott, Murphy & Presser

[57] ABSTRACT

Disclosed are a datalink system, which has: a data transmission system which is composed of a parallel-to-serial converter which converts a parallel signal into a serial signal, a data transmission line which transmits the serial signal output from the parallel-to-serial converter and a serial-to-parallel converter which converts the serial signal transmitted through the data transmission line into the parallel signal; and a control signal transmission system which is composed of a control signal transmission line and lies in parallel with the data transmission system, and a communication network which has a data network and a control signal network.

4 Claims, 3 Drawing Sheets

DATALINK SYSTEM AND COMMUNICATION NETWORK

FIELD OF THE INVENTION

This invention relates to a datalink system and a communication network, and more particularly to, a datalink system for interconnecting between boards or cabinets in a computer and a communication network for interconnecting between processors or memories in a parallel computer.

BACKGROUND OF THE INVENTION

In computers, many datalinks are used to conduct data communications between various devices composing its system. Recently, a serial datalink that a parallel signal is converted into a serial signal by time-division multiplexing and then transmitted is widely used since it has merits that the cable numbers can be reduced and the skewing between channels as in the case of a parallel datalink does not occur. In general, in the serial datalink, a certain signal continues to be transmitted to obtain the bit synchronization or frame synchronization of a receiver even when there is no packet to be transmitted. For example, in the Fibre Channel(ANSI X3T11, Fibre Channel Physical and Signaling Interface Rev.4.3, 1994) which is a standard of datalinks for connecting peripheral equipments, an idle signal continues to be transmitted when there is no packet(or frame in the Fibre Channel). In the Fibre Channel, to distinguish a packet from an idle signal, Start of Frame and End of Frame delimiters are added to the start and end, respectively, of the packet.

On the other hand, to detect an error during data transmission in a computer, a parity signal, which is added in the proportion of one bit to one byte data, is often used. For example, if the number of 1 in one byte data is odd, then the parity signal is 1, or, if the number is even, then the parity signal is 0.

These techniques can be applied not only to a datalink with point-to-point connection but also to a network with a switch. The aforementioned Fibre Channel has also definitions for the standards of a star network which are provided with a switch called Fabric and a loop network other than point-to-point connection. However, these networks are not different from the point-to-point connection in that delimiters are added before and after a packet.

However, in the conventional techniques, there is a problem that the overhead is increased due to the addition of the delimiters and the latency of a datalink is thereby increased. For example, in the Fibre Channel, since both the Start of Frame and End of Frame delimiters have one word(40 bits) length, the data reception is so much delayed. Especially in the datalink for interconnecting between processors or memories in the parallel computer, the increase in latency is a serious problem since it causes the degradation of system performance.

On the other hand, when the parity signal is added to data, the transmission capacity of a datalink needs to be so much increased. Especially in the serial datalink, in order to increase the transmission capacity, the number of channels to conduct the parallel-to-serial conversion needs to be increased, therefore costing more. For example, though data itself needs only 8-to1 parallel-to-serial conversion, the parity-added data needs 9-to1 parallel-to-serial conversion. Since the 9-to1 parallel-to-serial conversion is not in common use, the cost will be highly increased. Meanwhile, since even the Fibre Channel does not support the parity transmission, some means for transmitting the parity needs to be provided.

These problems exist not only in a point-to-point datalink but also in a network.

SUMMARY OF THE INVENTION

Accordingly, it is an object of the invention to provide a datalink system and a communication network which have a reduced latency.

It is a further object of the invention to provide a datalink system and a communication network in which a parity transmission can be conducted without increasing a transmission capacity.

According to the first aspect of the invention, a datalink system, comprises:

a data transmission system which is composed of a parallel-to-serial converter which converts a parallel signal into a serial signal, a data transmission line which transmits the serial signal output from the parallel-to-serial converter and a serial-to-parallel converter which converts the serial signal transmitted through the data transmission line into the parallel signal; and a control signal transmission system which is composed of a control signal transmission line and lies in parallel with the data transmission system.

According to the second aspect of the invention, provided is a datalink system that, in the first aspect of the invention, the data transmission system has a signal delay equal to that of the control signal transmission system.

According to the third aspect of the invention, provided is a datalink system that, in the second aspect of the invention, the data transmission line has a signal delay equal to that of the control signal transmission line, and the control signal transmission line is provided with a delay line laid before and/or after the control signal transmission line.

According to the fourth aspect of the invention, provided is a datalink system that, in the third aspect of the invention, the data transmission line is of an optical fiber, and the control signal transmission line is of an electrical cable which has a signal propagation velocity equal to that of the optical fiber.

According to the fifth aspect of the invention, provided is a datalink system that, in the first aspect of the invention, the control signal transmission system transmits a strobe signal which indicates whether a signal transmitted through the data transmission system is valid or invalid.

According to the sixth aspect of the invention, provided is a datalink system that, in the first aspect of the invention, the control signal transmission system transmits a parity signal which is related to a signal transmitted through the data transmission system.

According to the seventh aspect of the invention, a communication network, comprises:

a data network which is composed of a plurality of transmission nodes, a parallel-to-serial converter which converts a parallel signal into a serial signal in each of the transmission nodes, a plurality of outgoing data transmission lines which transmit the serial signal output from each of the transmission nodes, a data switch which is connected with the outgoing data transmission lines, a plurality of incoming data transmission lines which are connected with the data switch, a plurality of reception nodes, each of which receiving the serial signal transmitted through each of the incoming data transmission lines and a serial-to-parallel converter which converts the serial signal into the parallel signal in each of the reception nodes; and a control signal network which is composed of a plurality of outgoing control signal transmission lines which are connected with the transmission nodes, a control signal switch which is connected with the outgoing control signal transmission lines and a plurality of incoming control signal transmission lines which connects the control signal switch with the reception nodes.

According to the eighth aspect of the invention, provided is a communication network that, in the seventh aspect of the invention, a signal delay from one of the transmission nodes to one of the reception nodes in the data network is equal to that from the same one of the transmission nodes to the same one of the reception nodes in the control signal network.

According to the ninth aspect of the invention, provided is a communication network that, in the eighth aspect of the invention, one of the outgoing data transmission lines and one of the outgoing control signal transmission lines which are connected to one of the transmission nodes have a signal delay equal to each other, one of the incoming data transmission lines and one of the incoming control signal transmission lines which are connected to one of the reception nodes have a signal delay equal to each other, and each of the outgoing control signal transmission lines and the incoming control signal transmission lines has a delay line laid before and/or after each of the outgoing control signal transmission lines and the incoming control signal transmission lines.

According to the tenth aspect of the invention, provided is a communication network that, in the ninth aspect of the invention, the outgoing data transmission lines and the incoming data transmission lines are of an optical fiber, and the outgoing control signal transmission lines and the incoming control signal transmission lines are of an electrical cable which has a signal propagation velocity equal to that of the optical fiber.

According to the eleventh aspect of the invention, provided is a communication network that, in the seventh aspect of the invention, the control signal network transmits a strobe signal which indicates whether a signal transmitted through the data network is valid or invalid.

According to the twelfth aspect of the invention, provided is a communication network that, in the seventh aspect of the invention, the control signal transmission network transmits a parity signal which is related to a signal transmitted through the data network.

BRIEF DESCRIPTION OF THE DRAWINGS

The invention will be explained in more detail in conjunction with the appended drawings, wherein.

DESCRIPTION OF THE PREFERRED EMBODIMENTS

A datalink system in the first preferred embodiment adopting the fourth, fifth and sixth aspects of the invention will be explained in FIG. 1.

Figure 1:
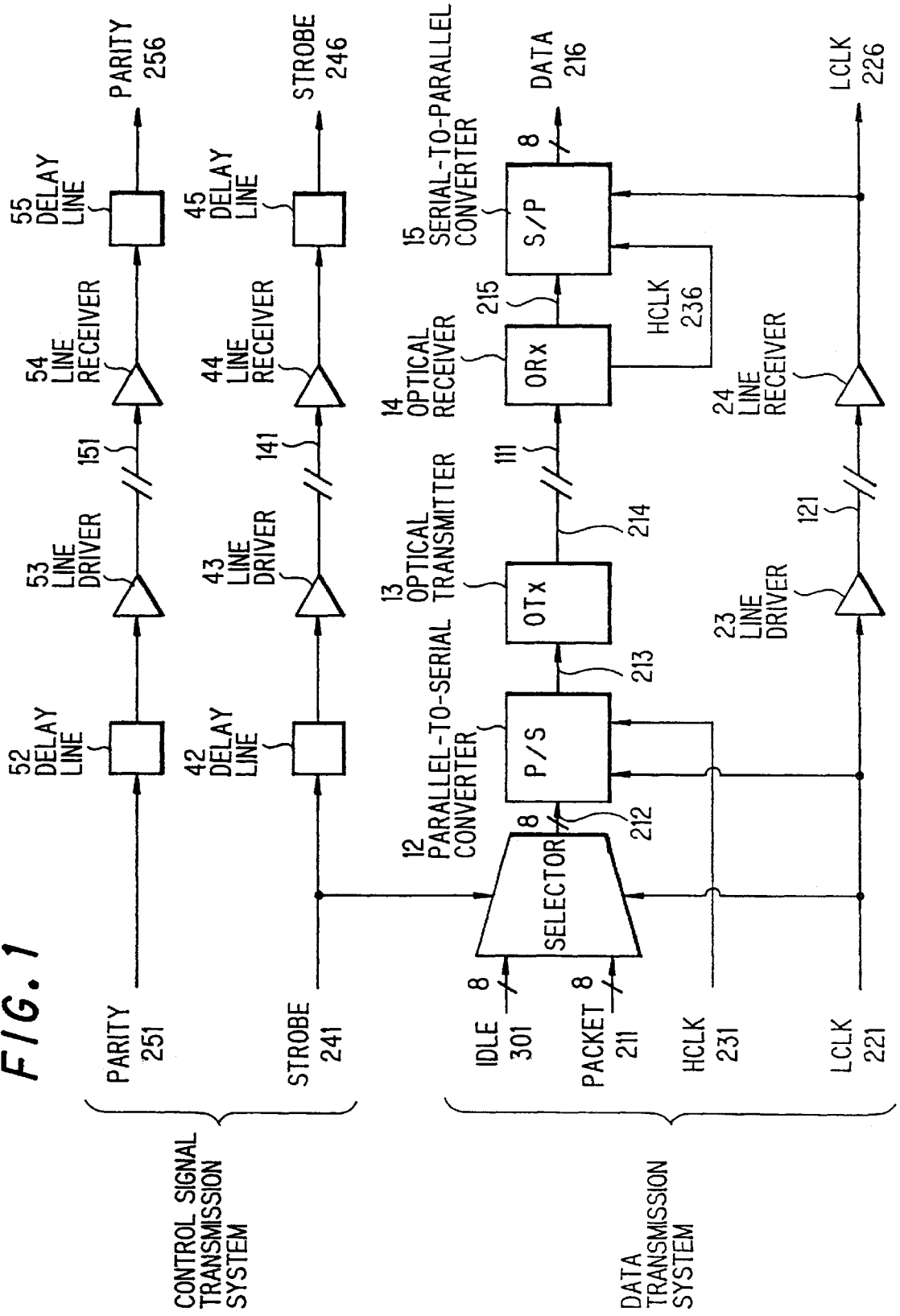
FIG. 1 is a block diagram showing a datalink system in a first preferred embodiment according to the invention.

As shown in FIG. 1, the datalink system comprises a data transmission system which is composed of a selector 11, a parallel-to-serial converter(P/S) 12, an optical transmitter (OTx) 13, an optical receiver(ORx) 14, a serial-to-parallel converter(S/P) 15, a line driver 23, a line driver 24, an optical fiber 111 and a coaxial cable 121, and a control signal transmission system which is composed of a delay line 42, a line driver 43, a line receiver 44, a delay line 45, a delay line 52, a line driver 53, a line receiver 54, a delay line 55 and coaxial cables 141 and 151. In FIG.1, 211 is a packet (PACKET), 212 is a parallel signal, 213 is a serial signal, 214 is an optical signal, 215 is a serial signal, 216 is a parallel signal(DATA), 221 is a low clock(LCLK), 226 is a low clock(LCLK), 231 is a high clock(HCLK), 236 is a high clock(HCLK), 241 is a strobe signal(STROBE), 246 is a strobe signal(STROBE), 251 is a parity signal(PARITY), 256 is a parity signal(PARITY) and 301 is an idle signal (IDLE).

Next, the operation of the datalink system in the first embodiment will be explained. In the datalink system, the strobe signal 241 is set to be LOW except when the packet is transmitted. At this time, the selector 11 selects the idle signal 301 that is a fixed pattern, "10101010" and outputs it as the parallel signal 212. The packet 211 is a variable-length packet with 8-bit width, and the parity signal 251 is added to 8 bits in the parallel direction. When the packet 211 is transmitted, the strobe signal 241 is First set to be HIGH. Then, the selector 11 selects the packet 211 and outputs it as the parallel signal 212. The parallel signal 212 is input to the parallel-to-serial converter 12 synchronizing with the low clock 221 with a frequency of 100 MHz, then converted into the serial signal 213 synchronizing with the high clock 231 with a frequency of 800 MHz. The serial signal 213 is converted into the optical signal 214 by the optical transmitter 13, then transmitted through the optical fiber 111. On the receiving side, the optical receiver 14 converts the optical signal 214 into the electrical serial signal 215 and outputs it. Simultaneously, the optical receiver 14 extracts the high clock 236 from the electrical serial signal 215 by using a PLL(phase locked loop) circuit. The serial signal 215 is input to the serial-to-parallel converter 15 synchronizing with the high clock 236, then converted into the parallel signal 216 with 8-bit width which synchronizes with the low clock 226.

The low clock 221 is transmitted through the line driver 23 and the coaxial cable 121, then passed through the line receiver to bring the low clock 226. Also, the parity signal 251 is transmitted through the delay line 52, the line driver 53 and the coaxial cable 151, then passed through the line receiver 54 and the delay line 55 to bring the parity signal 256. Similarly, the strobe signal 241 is transmitted through the coaxial cable 141 to bring the strobe signal 246. The coaxial cables 121, 141 and 151 are designed such that they have a signal propagation velocity equal to that of the optical fiber 111 and have the same length as the optical fiber 111. Therefore, the coaxial cables 121, 141 and 151 have the same signal delay as the optical fiber 111.

As explained above, the phase difference between the low clock 226 and the serial signal 215 on the receiving side is equal to the phase difference between the low clock 221 and the serial signal 213 on the transmitting side. Thus, the frame synchronization can be obtained by conducting serial-to-parallel conversion by using the low clock 226 in the serial-to-parallel converter 15.

The delay lines 42, 52 and the delay lines 45, 55 are adjusted to have delays equal to those of the parallel-to-serial converter 12 and the serial-to-parallel converter 15, respectively. Here, as described earlier, the coaxial cables 121, 141 and 151 have the same signal delay as the optical fiber 111. Therefore, the parity signal 256 and the strobe signal 246 on the receiving side can be simultaneously output from the delay lines with a packet in the parallel signal 216. Namely, when the strobe signal 246 is HIGH, the parallel signal 216 is a packet, or, when the strobe signal 246 is LOW, the parallel signal 216 is an idle signal. For example, if the datalink is followed by a FIFO(first-in first-out) memory, by inputting the strobe signal 246 directly to a write-enable terminal of the FIFO memory, the packet in the parallel signal 216 and the parity signal to be added thereto can be written in the FIFO memory.

As described above, in the optical datalink system in the first embodiment, due to the adoption of the fifth aspect of the invention, it is not necessary for the delimiters to be added to before and after the packet. Therefore, the latency of data transmission can be reduced so much. Also, due to the adoption of the sixth aspect of the invention, the parity signal does not need to be transmitted through the optical fiber for data transmission and therefore the transmission capacity of the data transmission system does not need to be increased. If the sixth aspect of the invention is not adopted, to increase the transmission capacity, a 9-to1 parallel-to-serial converter and a 1-to-9 serial-to-parallel converter will be needed in place of the parallel-to-serial converter 12 and the serial-to-parallel converter 15, respectively. Since such a 9-to1 parallel-to-serial converter and 1-to-9 serial-to-parallel converter are not commonly used, they are difficult to get and very costly.

In the datalink system in the first embodiment, the data signal with a high bit rate of 800 Mb/s is optically transmitted and the low clock with a frequency of 100 MHz and the strobe signal and the parity signal with a low bit rate of 100 Mb/s are transmitted through the coaxial cables. Such low bit rate signals are relatively easy to transmit through a coaxial cable, therefore not costing so much.

Figure 2:
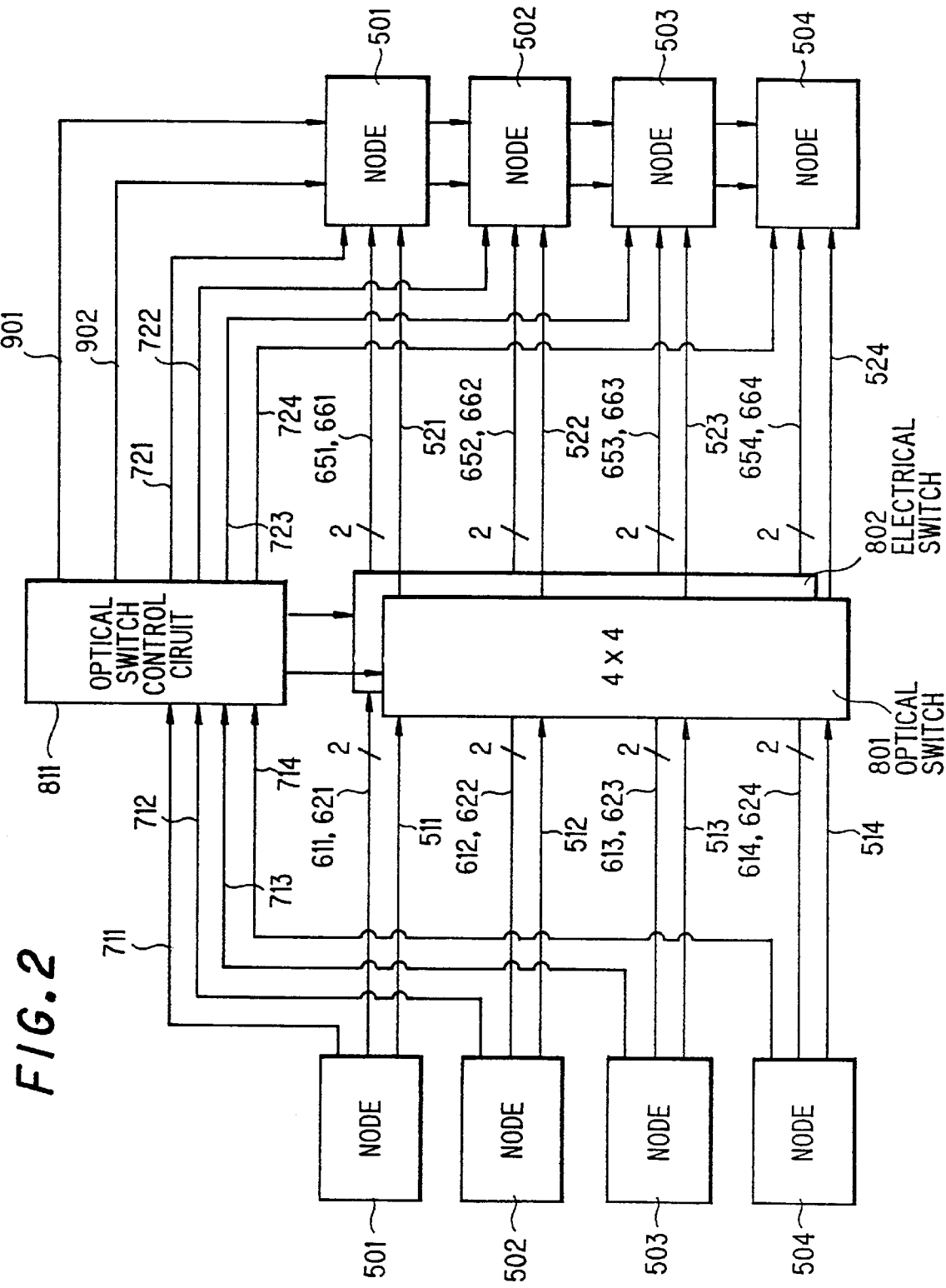
FIG. 2 is a block diagram showing a communication network in a second preferred embodiment according to the invention.

A communication network in the second preferred embodiment adopting the tenth, eleventh and twelfth aspects of the invention will be explained in FIG. 2, wherein like parts are indicated by like reference numerals as used in FIG. 1.

The communication network, which includes four nodes 501, 502, 503 and 504 that serve both as transmission nodes and as reception nodes, comprises a data network composed of optical fibers 511 to 514, 521 to 524 and an optical switch 801, a control signal network composed of coaxial cables 611 to 614, 621 to 624, 651 to 654 and 661 to 664 and an electrical switch 802, an optical switch control circuit for conducting arbitration control of the optical switch 801 and the electrical switch 802, coaxial cables 711 to 714 and 721 to 724, a low clock distributing line 901 and a high clock distributing line 902.

To the respective nodes 501, 502, 503 and 504, a low clock 221 and a high clock 231 are distributed through the low clock distributing line 901 and the high clock distributing line 902 from the optical switch control circuit 811. Here, the lengths of the low clock distributing line 901 and the high clock distributing line 902 are adjusted such that there occurs no clock phase difference between the nodes.

Figure 3:
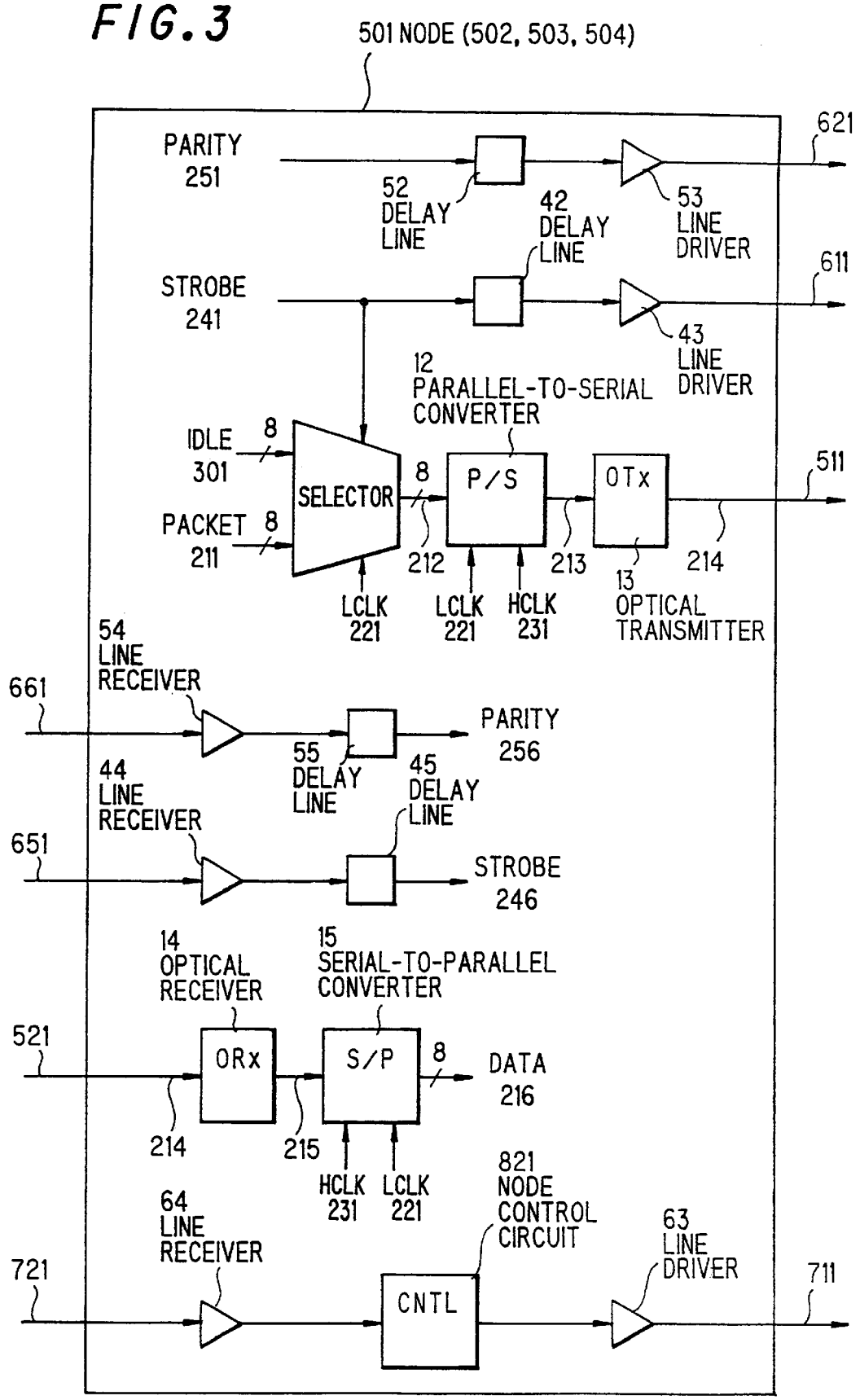
FIG. 3 is a block diagram showing a network interface of a node in FIG. 2.

FIG. 3 shows a network interface composition of the node 501. The network interface compositions of the other three nodes 502, 503 and 504 are similarly composed. The node 501 comprises a selector 11, a parallel-to-serial converter 12, an optical transmitter 13, an optical receiver 14, a serial-to-parallel converter 15, a delay line 42, a line driver 43, a line receiver 44, a delay line 45, a delay line 52, a line driver 53, a line receiver 54, a delay line 55, a line driver 63, a line receiver 64 and a node control circuit(CNTL) 821. In FIG. 3, 211 is a packet(PACKET), 212 is a parallel signal, 213 is a serial signal, 214 is an optical signal, 215 is a serial signal, 216 is a parallel signal(DATA), 241 is a strobe signal (STROBE), 246 is a strobe signal(STROBE), 251 is a parity signal(PARITY), 256 is a parity signal(PARITY) and 301 is an idle signal(IDLE).

Next, the operation of the communication network in the second embodiment will be explained.

Taking the case of transmitting a packet from the node 501 to the node 502, the node control circuit 821 of the node 501 first sends a transmission request through the coaxial cable 711 to the optical switch control circuit 811. Then, the optical switch control circuit 811 arbitrates between transmission requests from the respective nodes and sends a transmission permission to a node to win the arbitration. Now, if only the node 501 is sending the transmission request, the optical switch control circuit 811 immediately sends the transmission permission through the coaxial cable 721 to the node control circuit 821 of the node 501.

In the respective nodes, when transmitting no packet, the strobe signal 241 is set to be LOW and the selector 11 selects the idle signal 301 with a fixed pattern, "10101010" and outputs it. Receiving the transmission permission, the nodes 501 sets the strobe signal to be HIGH, switching the selector 11 to the side of the packet 211, then outputting the packet. After outputting the packet, the node 501 puts back the strobe signal 241 to be LOW. The parallel signal 212 output from the selector 11 is input to the parallel-to-serial converter 12 while synchronizing with the low clock 221 with a frequency of 100 MHz, then converted into the serial signal 213 synchronizing with the high clock 231 with a frequency of 800 MHz. The serial signal 213 is then converted into the optical signal 214 by the optical transmitter 13 and output to the optical fiber 511. On the other hand, the strobe signal 241 is transmitted through the delay line 42 and the line driver 43 to the coaxial cable 611. Also, the parity signal 251 to be added to the packet 211 is transmitted through the delay line 52 and the line driver 53 to the coaxial cable 621. The parallel-to-serial converter 12 has a signal delay equal to one cycle of the low clock 221, i.e., 10 ns., and the optical transmitter 13 has a signal delay of nearly zero. The delay lines 42, 52 have a signal delay of 10 ns. Therefore, the packet, the strobe signal and the parity signal are simultaneously output from the node 501. The coaxial cables 611, 621 are designed such that they have a signal propagation velocity equal to that of the optical fiber 511 and have the same length as the optical fiber 511. Therefore, the strobe signal and the parity signal reach the electrical switch 802 simultaneously when the packet reaches the optical switch 801.

When a predetermined time period is passed after sending the transmission permission to the node 501, the optical switch control circuit 811 switches the optical switch 801 and the electrical switch 802 to connect between the optical fiber 511 and the optical fiber 522, between the coaxial cable 611 and the coaxial cable 652 and between the coaxial cable 621 and the coaxial cable 662. The predetermined time period is determined such that the optical switch 801 is switched 5 ns. before when the packet reaches the optical switch 801. Therefore, the packet is transmitted through the optical fiber 522 to the node 502 and the strobe signal and the parity signal are transmitted through the coaxial cables 652, 662 to the node 502. The coaxial cables 652, 662 are designed such that they have a signal propagation velocity equal to that of the optical fiber 522 and have the same length as the optical fiber 522. However, since the electrical switch 802 has a signal delay of 10 ns. whereas the signal delay of the optical switch 801 is nearly zero, the strobe signal and the parity signal reach the node 502 10 ns. later than the packet.

The optical signal 214 transmitted through the optical fiber 522 is converted into the electrical serial signal 215, input to the serial-to-parallel converter 15 while synchronizing with the high clock 231, then converted into the parallel signal 216 with 8-bit width that is synchronized with the low clock 221. By adjusting the length of the optical fiber 522, the frame phase of the serial signal 215 is synchronized with the low clock 221, thereby the frame synchronization can be achieved in the serial-to-parallel converter 15. On the other hand, the strobe signal transmitted through the coaxial cable 652 is output as the strobe signal 246 through the line receiver 44 and the delay line 45, and the parity signal transmitted through the coaxial cable 662 is output as the parity signal 256 through the line receiver 54 and the delay line 55. The optical receiver 14 and the serial-to-parallel converter 15 have a signal delay of 10 ns. and the delay lines 45, 55 have a signal delay of 10 ns. At the time when reaching the node 502, the strobe signal and the parity signal are 10 ns. later than the packet. Therefore, the strobe signal 246 and the parity signal 256 can be output simultaneously with the packet in the parallel data signal 216. Namely, when the strobe signal 246 is HIGH, the parallel signal 216 is a packet, or, when the strobe signal 246 is LOW, the parallel signal 216 is an idle signal. For example, if the network is followed by a FIFO memory, by inputting the strobe signal 246 directly to a write-enable terminal of the FIFO memory, the packet in the parallel signal 216 and the parity signal to be added thereto can be written in the FIFO memory.

As described above, in the optical communication network in the second embodiment, due to the adoption of the eleventh aspect of the invention, it is not necessary for the delimiters to be added to before and after the packet Therefore, the latency of data transmission can be reduced so much. Also, due to the adoption of the twelfth aspect of the invention, the parity signal does not need to be transmitted through the data network and therefore the transmission capacity of the data network does not need to be increased. If the twelfth aspect of the invention is not adopted, to increase the transmission capacity, a 9-to-1 parallel-to-serial converter and a 1-to-9 serial-to-parallel converter will be needed in place of the parallel-to-serial converter 12 and the serial-to-parallel converter 15, respectively. Since such a 9-to-1 parallel-to-serial converter and 1-to-9 serial-to-parallel converter are not commonly used, they are difficult to get and very costly.

In the communication network in the second embodiment, the data signal with a high bit rate of 800 Mb/s is transmitted through the optical network and the strobe signal and the parity signal with a low bit rate of 100 Mb/s are transmitted through the electrical network. Such low bit rate signals are relatively easy to transmit through a coaxial cable, therefore not costing so much.

Though, in the first embodiment, both the strobe signal and the parity signal are transmitted through the control signal transmission system, the parity signal may be transmitted through the data transmission system with the packet and only the strobe signal may be transmitted through the control signal transmission system. Alternatively, only the parity signal may be transmitted through the control signal transmission system.

Though, in the second embodiment, both the strobe signal and the parity signal are transmitted through the control signal network, the parity signal may be transmitted through the data network with the packet and only the strobe signal may be transmitted through the control signal network. Alternatively, only the parity signal may be transmitted through the control signal network.

Though, in the first and second embodiments, the data transmission is conducted by the optical communication system, it may be conducted by an electrical communication system using a coaxial cable or a twisted-pair line. Though the transmission of the control signal is conducted by using the coaxial cable, it may be conducted by an electrical communication system using a twisted-pair line etc. or by an optical communication system.

In the first and second embodiments, the data and/or the control signal may be encoded by using, for example, a 8B10B code.

Though, in the first embodiment, the frame synchronization is obtained by separately transmitting the low clock, it may be obtained by adding a synchronization pattern to the packet or by using the idle signal as a synchronization pattern. Also, the high clock, which is extracted from the data, may be separately transmitted.

Though, in the second embodiment, the low clock and the high clock are distributed from the optical switch control circuit to synchronize all the nodes, the respective nodes may be non-synchronously operated. The high clock can be extracted from the data by using, e.g., a PLL circuit, and, even if not distributing the low clock, the frame synchronization can be obtained by adding a synchronization pattern to the packet or by using the idle signal as a synchronization pattern.

In the first and second embodiments, the data transmission line and the control signal transmission line may be physically separated or may be combined as one cable in appearance. For example, by using a cable in which an optical fiber and a coaxial cable are combined and covered together, the lengths of the optical fiber and the coaxial cable can be very easily equalized to each other.

Though, in the first and second embodiments, one strobe signal is added to the data signal with 8-bit width, the bit width of the data signal may be optionally determined. For example, to the data signal with 16-bit, 32-bit or 64-bit width, one strobe signal may be added.

Though, in the first and second embodiments, the 1-bit parity signal is added to the data signal with 8-bit width, the addition rate of the parity signal may be optionally determined. For example, to the data signal with 16-bit, 32-bit or 64-bit width, the 1-bit parity signal may be added.

Though, in the first and second embodiments, the low clock frequency is 100 MHz, the high clock frequency is 800 MHz and the multiplexing number of the parallel-to-serial conversion is 8-to-1, these may be optionally set.

Though, in the second embodiment, the respective nodes serve both as a transmission node and as a reception node, the transmission node and the reception node may be separately provided.

In the first aspect of the invention, the control signal transmission system is provided independent of the data transmission system. Therefore, without changing the composition of the data transmission system, various control signals can be transmitted through the control signal transmission system. Since the control signal transmission system does not need a parallel-to-serial converter and a serial-to-parallel converter and the bit rate is lower than the data transmission system, the control signal transmission can be easily composed.

In the second aspect of the invention, the signal delay of the data transmission system and the control signal transmission system are adjusted to be equal to each other. Therefore, the strobe signal or the parity signal transmitted through the control signal transmission system reaches the receiving side simultaneously with the data. Namely, the control signal can be immediately sent to the following device with the data, therefore facilitating the transmission control and reducing the latency so much. For example, if the control signal is a strobe signal and the following device is a FIFO memory, by inputting the strobe signal directly to a write-enable terminal of the FIFO memory, only effective part in the data can be written directly in the FIFO memory. If the control signal is a parity signal and the following device is a parity check circuit, by sending the parity and the data to the parity check circuit, the parity check circuit can immediately start the parity check.

In the third aspect of the invention, the data transmission line has a signal delay equal to that of the control signal transmission line. Therefore, by providing a first delay line with a signal delay equal to that of a parallel-to-serial converter laid before the data transmission line and providing a second delay line with a signal delay equal to that of a serial-to-parallel converter laid after the data transmission line, the signal delay of the data transmission system can be easily equal to that of the control signal transmission system.

In the fourth aspect of the invention, the data transmission line is of an optical fibers and the control signal transmission line is of an electrical cable which has a signal propagation velocity equal to that of the optical fiber. Since the data transmission line is required of a large capacity, optical fibers are suitable. On the other hand, since the control signal transmission line is not required of a large capacity, electrical cables which can reduce the entire cost of the datalink system are suitable. Though the signal propagation velocity of an optical fiber is generally different from that of an electrical cable, by adjusting the dielectric constant of an insulator for the electrical cable to equalize the signal propagation velocity to that of the optical fiber, the data transmission line and the control signal transmission line can easily have the same signal delay by equalizing their lengths Even if the transmission lines are changed, the adjustment needs only to equalize the lengths of the data transmission line and the control signal transmission line.

In the fifth aspect of the invention, the control signal transmission system transmits a strobe signal which indicates whether a signal transmitted through the data transmission system is valid or invalid. Namely, if the signal transmitted through the data transmission system is a packet, the strobe signal is set to be HIGH, or, if the signal is an idle signal, the strobe signal is set to be LOW. Thereby, the packet and the idle signal can be distinguished. Therefore, delimiters to be added before and after the packet are not necessary. As a result, the latency of the datalink system can be reduced.

In the sixth aspect of the invention, a parity signal to be added to a signal transmitted through the data transmission system is transmitted through the control signal transmission system. Therefore, without increasing the transmission capacity of the data transmission system, the parity signal can be transmitted and the error check can be conducted on the receiving side. Furthermore, since the increase in the multiplexing number of the parallel-to-serial converter is not required to transmit the parity signal, the cost can be reduced so much.

In the seventh aspect of the invention, the control signal network is provided independent of the data network. Namely, by transmitting the various control signal through the control signal network, the same effect as the first aspect of the invention can be obtained.

In the eighth aspect of the invention, the same effect as the second aspect of the invention can be obtained.

In the ninth aspect of the invention, the same effect as the third aspect of the invention can be obtained.

In the tenth aspect of the invention, the same effect as the fourth aspect of the invention can be obtained.

In the eleventh aspect of the invention, the same effect as the fifth aspect of the invention can be obtained.

In the twelfth aspect of the invention, the same effect as the sixth aspect of the invention can be obtained.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A datalink system for transmitting data with minimal latency, comprising:

a data transmission system which is composed of a parallel-to-serial converter which converts a parallel signal into a serial signal, a data transmission line which transmits the serial signal one way and a serial-to-parallel converter which converts the transmitted serial signal into the parallel signal; and a control signal transmission system which is composed of a control signal transmission line for generating a transmission control signal for transmission which lies in parallel with the data transmission system, said data transmission system including a delay equal to that of the control signal transmission system, wherein the control signal transmission line is provided with a delay line electrically connected before and/or after the control signal transmission line, and wherein the control signal transmits at least one of frame and parity information relating to said serial signal, and wherein:

said data transmission line is of an optical fiber, and said control signal transmission line is of an electrical cable constructed to have a signal propagation velocity equal to that of said optical fiber.

2. A datalink system, according to claim 1, wherein:

said control signal transmission system transmits a strobe signal which indicates whether a signal transmitted through said data transmission system is valid or invalid.

3. A communication network for transmitting data with minimal latency, comprising:

a data network which is composed of a plurality of transmission nodes, a parallel-to-serial converter which converts a parallel signal into a serial signal in each of the transmission nodes and outputs the serial signal, a plurality of outgoing data transmission lines which transmit the serial signals output from each of the transmission nodes one way, a data switch connected with said outgoing data transmission lines, a plurality of incoming data transmission lines connected with said data switch, a plurality of reception nodes, each of which receives the serial signal transmitted through each of said incoming data transmission lines and a serial-to-parallel converter which converts the serial signal into the parallel signal in each of the reception nodes; and a control signal network which is composed of a plurality of outgoing control signal transmission lines connected with the transmission nodes, a control signal switch connected with the outgoing control signal transmission lines and a plurality of incoming control signal transmission lines which connects the control signal switch with the reception nodes, wherein a signal delay from one of the transmission nodes to one of the reception nodes in the data network is equal to a signal delay from one of the transmission nodes to the same reception node in the control signal network, wherein one of the outgoing data transmission lines and one of the outgoing control signal transmission lines connected to one of the transmission nodes have a signal delay equal to each other, one of the incoming data transmission lines is connected to one of the reception nodes have a signal delay equal to each other, and each of the outgoing control signal transmission lines and the incoming control signal transmission lines has a delay line electrically connected before and/or after each of the outgoing control signal transmission lines and the incoming control signal transmission lines, wherein each control signal includes at least one of frame and parity information relating to the serial signal at the respective reception node, and wherein:

said outgoing data transmission lines and said incoming data transmission lines are of an optical fiber, and said outgoing control signal transmission lines and said incoming control signal transmission lines are of an electrical cable constructed to have a signal propagation velocity equal to that of said optical fiber.

4. A communication network, according to claim 3, wherein:

said control signal network transmits a strobe signal which indicates whether a signal transmitted through said data network is valid or invalid.

* * * * *